United States Patent Office 3,133,085
Patented May 12, 1964

3,133,085
LIQUID PHASE AMMONOLYSIS OF BUTYROLACTONE IN THE PRESENCE OF BORIC ACID AS CATALYST
John F. Start, Hamilton Township, Mercer County, N.J., assignor to FMC Corporation, New York, N.Y., a corporation of Delaware
No Drawing. Filed Feb. 6, 1962, Ser. No. 171,349
3 Claims. (Cl. 260—326.5)

This invention relates to the preparation of pyrrolidone, and more particularly, to the preparation of pyrrolidone by the liquid phase ammonolysis of butyrolactone.

Pyrrolidone is commercially prepared at the present time by the liquid phase reaction of butyrolactone with ammonia at temperatures in the range of 200–250° C. and elevated pressures for periods of 6–8 hours. Yields above about 90% are difficult to attain.

It is an object of this invention to provide an economical process for the production of high yields of pyrrolidone at short reaction times.

I have now found that pyrrolidone can be prepared in high yields and at short reaction times by reacting butyrolactone and ammonia in the liquid phase in the presence of boric acid. Surprisingly, in the presence of boric acid yields in excess of 90% of theory are readily obtained in substantially shorter reaction times than were previously required.

Butyrolactone is a commercially available liquid which is generally prepared by a 3-step process involving the reaction of acetylene with formaldehyde to produce 2-butyne-1,4-diol. The unsaturated dialcohol is then reduced to 1,4-butanediol, which is catalytically dehydrogenated to butyrolactone.

The ammonolysis of butyrolactone is illustrated by the following equation:

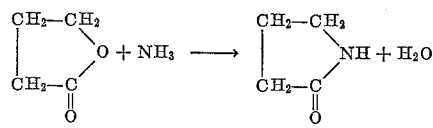

The reaction is carried under substantially the same reaction conditions as those heretofore used for the uncatalyzed ammonolysis of butyrolactone in the liquid phase. The reaction is conducted by charging butyrolactone, ammonia, and boric acid to an autoclave and heating the mixture, with constant agitation. The ammonia is suitably added as liquid ammonia. Solvents may be used, if desired, however they give no particular advantage.

As the catalyst, any commercially available boric acid may be used. The catalyst should be present during the reaction in an amount of about 1–20% by weight based upon the butyrolactone charged. There is no particular advantage in using more than about 20%, although no adverse effects are encountered in the use of greater amounts. Preferably, the catalyst is present in the amount of about 5–15%.

The ammonia should be present in at least a stoichiometric amount; that is, 1 mole of ammonia for each mole of butyrolactone. For best results, a stoichiometric excess of ammonia should be used. There is no advantage in using more than about 10 moles of ammonia per mole of butyrolactone, although larger amounts may be used, if desired. Preferably, about 2–4 moles of ammonia are present for each mole of butyrolactone.

The ammonolysis reaction is carried out at temperatures of at least about 150° C. A suitable temperature range is about 150–350° C., although higher or lower temperatures may be used, if desired. The preferred operating temperatures are in the range of about 200–300° C. At temperatures below about 200° C. the reaction is somewhat slower and longer reaction times are required. When operating at temperatures in excess of about 300° C., the conversion and the reaction rate are quite high, however significant amounts of by-products are formed. At temperatures above about 350° C., the amount of by-product formation becomes substantial.

The reaction proceeds at moderate pressures of at least about 200 p.s.i.g. Variations in pressure have no great effect upon the reaction, provided the pressure is sufficient to maintain the butyrolactone in the liquid phase and to provide a substantial solubility of ammonia in the butyrolactone. Adequate pressure is readily provided by charging the ammonia to the autoclave under its own vapor pressure, and maintaining autogenous pressure during the reaction. Under these conditions, the pressure usually rises to about 1,000–3,000 p.s.i.g. at the reaction temperature.

When the reaction is complete, the medium is allowed to cool, and the autoclave is vented and opened. The insoluble catalyst is separated by filtration, and the reaction mixture is distilled under reduced pressure to give a good yield of pyrrolidone of high purity. When an extremely pure product is desired, the product can be rectified to give pyrrolidone of greater than 99% purity. The pyrrolidone obtained by this process is substantially purer than that obtained by the uncatalyzed reaction of the prior art.

The following examples, illustrating the novel method disclosed herein for preparing pyrrolidone, are presented without any intention that the invention be limited thereto. All parts and percentages are by weight.

Example 1

(a) Ten parts of butyrolactone and one part of boric acid in the form of fine crystals were charged to a stainless steel, stirred autoclave. The autoclave was closed and 6.5 parts of liquid ammonia were charged from a weighed tank by warming the tank with a sun lamp. Agitation was begun, and the temperature was raised to 250° C. over a 1.5 hr. period. After maintaining the temperature at 250° C. for 1 hr., the reaction medium was cooled by passing water through a coil within the autoclave. The product slurry was filtered to remove boric acid, and the filtrate was distilled at atmospheric pressure to remove water and ammonia. The crude product was distilled at 20 mm. Hg to give 8.3 parts of a pyrrolidone fraction. This fraction was analyzed by vapor phase chromatography and found to contain 92% of the theoretical amount of pyrrolidone. No attempt was made to recover pyrrolidone adsorbed by the catalyst.

(b) For comparison, the example was repeated omitting the boric acid catalyst. The ammonolysis was allowed to continue for 2 hrs.

Example 2

This example was carried out following the procedure of Example 1, except that the temperature was maintained at 275° C.

The data for the examples are presented in the following table:

| Example | Catalyst | $NH_3$/Feed, mole ratio | Temp., °C. | Time, hr. | Pyrrolidone Yield, percent of theory | High Boiling Bottoms, percent on crude product |
|---|---|---|---|---|---|---|
| 1(a) | boric acid | 3 | 250 | 1.0 | 92 | 2.5 |
| 1(b) | none | 3 | 250 | 2.0 | 88 | 8.3 |
| 2 | boric acid | 3 | 275 | 1.0 | 91 | 4.9 |

As will be apparent to those skilled in the art, numerous modifications and variations of the amount of catalyst, reactant ratios, temperatures and pressures illustrated above may be made without departing from the spirit of the invention or the scope of the following claims.

I claim:

1. In the process for preparing pyrrolidone by the liquid phase ammonolysis of butyrolactone at elevated temperatures and pressures, the improvement which comprises carrying out the reaction in the presence of boric acid.

2. The improved process of claim 1 in which the boric acid is present in an amount of 5–15% by weight based upon the butyrolactone charged, the temperature is 200–300° C. and the pressure is 1,000–3,000 p.s.i.g.

3. The improved process of claim 1 in which the temperature is 150–350° C. and the pressure is at least 200 p.s.i.g.

References Cited in the file of this patent

UNITED STATES PATENTS 2,267,757    Schuster et al. _____ Dec. 30, 1941

FOREIGN PATENTS 821,982    Great Britain _____ Oct. 14, 1959